United States Patent Office 2,930,969
Patented Mar. 29, 1960

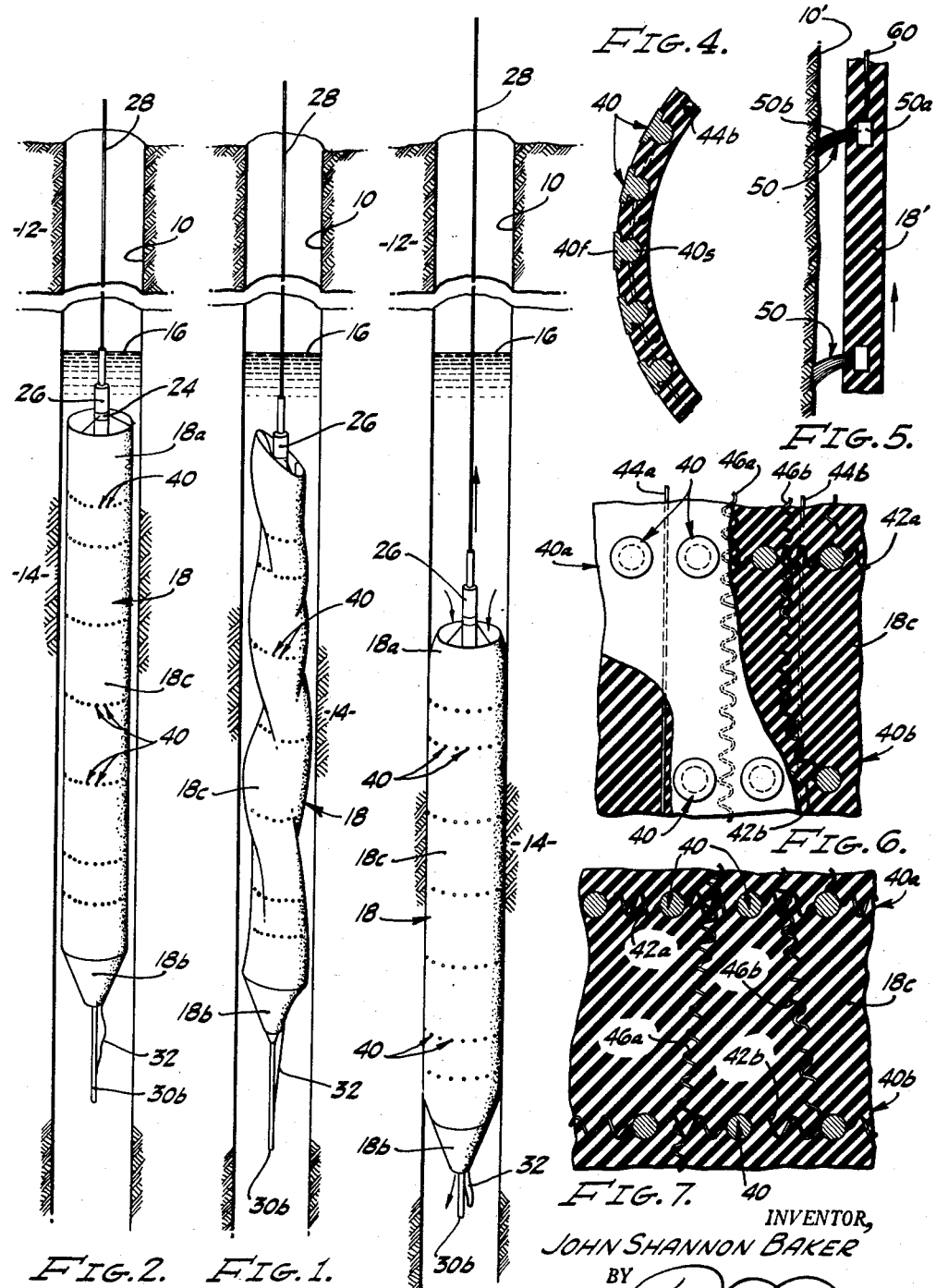

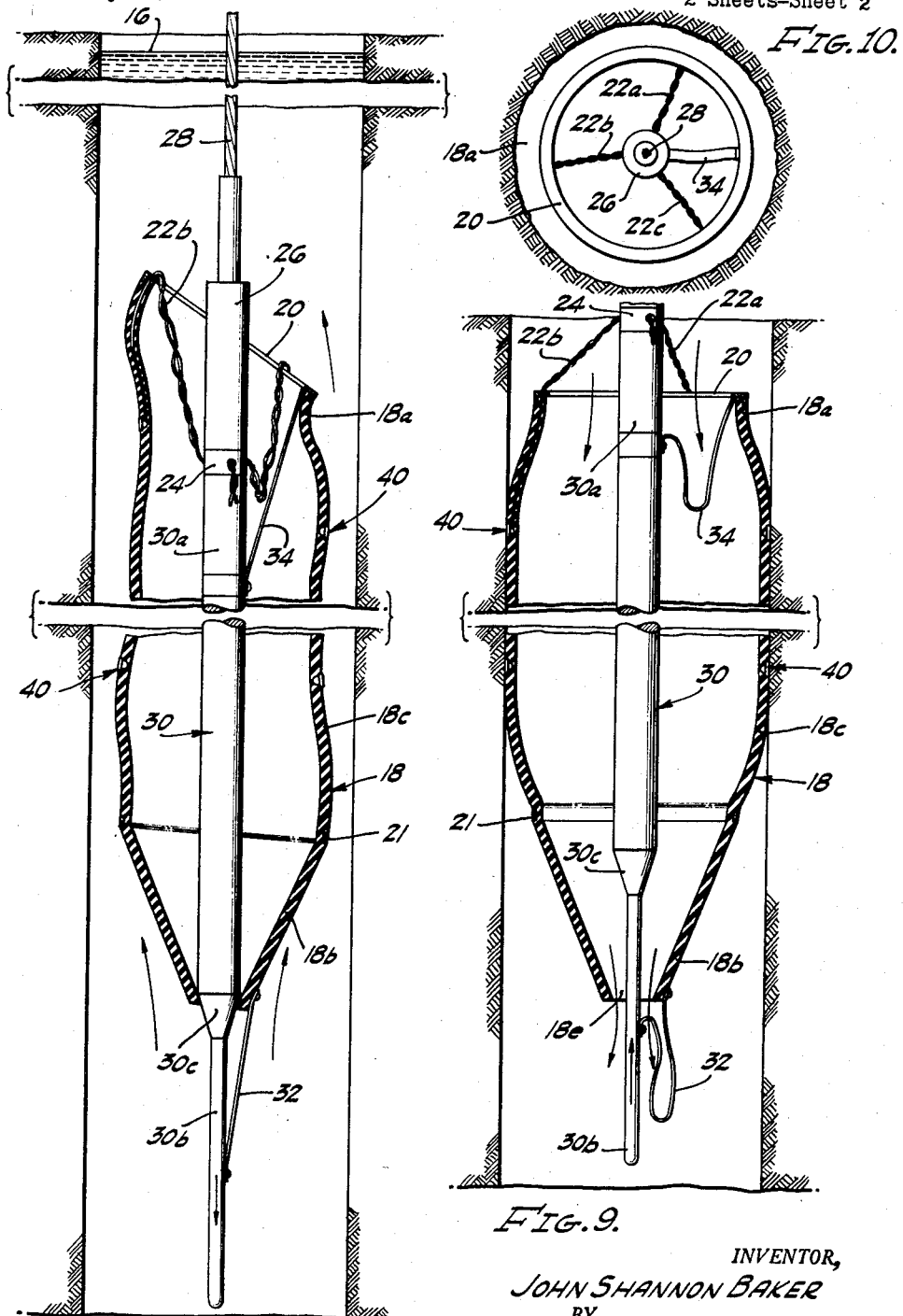

2,930,969

ELECTRICAL EARTH BOREHOLE LOGGING APPARATUS

John Shannon Baker, Fullerton, Calif., assignor, by mesne assignments, to Dresser Industries, Inc., Dallas, Tex., a corporation of Delaware Application May 16, 1956, Serial No. 585,251

9 Claims. (Cl. 324—10)

This invention relates to electrical logging apparatus of the type employed in electrically investigating or "logging" the earth or rock formations encircling an earth borehole. More specifically, the invention is directed to improvements in electrode assemblies, devices or apparatus, adapted to be traversed through an extent of a fluid-filled earth borehole to convey electric current to or from the earth formations encircling the traversed extent of borehole.

The art of electrically "logging" or investigating borehole-encircling geological formations is now well established, with a wide variety of procedures and apparatuses in use. In the most common procedures, an apparatus including suitable electrodes is lowered or raised (traversed) through all or a part of a borehole by means including a cable comprising insulated conductors which carry currents to and/or from suitable electrodes, whereby electrical formation resistivity, spontaneously generated electric potentials, and like electrical quantities may be measured or studied as the traverse is made. Usually the values of the electrical quantities, or variations thereof, are graphically recorded with correlation to depth or position in the borehole, to provide records or "logs" from which valuable deductions and/or determinations concerning the geology of the traversed formations can be made. When the current emanating and receiving electrodes are secured to or supported on an insulated rigid instrument-housing container, as is usual, the electric currents under consideration must flow through a portion of the fluid with which earth boreholes are commonly filled, since the container must necessarily be of smaller diameter than the borehole. The electrical effects of the borehole fluid (which may be salty mud and of relatively low resistivity, or may be of oil emulsion and of relatively high resistivity) may vary considerably due to temperature, borehole diameter, and other variations, and constitute an undesirable factor in the logging procedure. Commonly termed "borehole effects," they may be such as to greatly reduce the accuracy or value of the log produced; hence efforts have been directed toward their elimination. One trend in that direction has been toward mounting the electrodes on springs or other means which force the electrodes into contact with the borehole wall during traverse of the logging tool through the borehole. Objectionable features presented by such spring and other prior art devices include uncertainty of operation of the springs due to clogging of recesses by mud solids contained in the borehole fluid, difficulty and uncertainty of releasing the springs or other electrode expanding means, undue expense of complex operating devices, and the like.

The present invention provides means of simple and inexpensive construction which are durable in service, easily moved to any desired position in a fluid-filled borehole preparatory to performing a logging traverse, and automatically operable incident to movement in a logging traverse to move and dispose electrode contacts into good contacting relation with the borehole wall and to maintain the contacts in such status during the traverse. Apparatus according to the concept of the invention, as will be evident to those skilled in the art, may be constructed to perform a logging traverse as the apparatus is moved inwardly in a borehole; however, for the sake of simplicity and conciseness of illustration, and since it is generally desirable to perform a logging traverse as the apparatus is moved outwardly through an extent of borehole, the invention will be illustrated by apparatus arranged for the latter mode of operation. As thus arranged, the apparatus may be moved inwardly in idle (non-logging) movement in any suitable manner, as by the action of gravitational force on a sinker device secured to a suitable cable; and may be moved outwardly in a logging traverse by withdrawing the cable, as by means of a winch. The necessary electrode contacts are suitably mounted so as to be exposed at the exterior of a tubular member which is diametrally elastic and normally in relaxed state of a diameter somewhat smaller than that of the borehole in which it is to be used. Suitable means are provided whereby during non-logging traverse or movement inwardly along the borehole the sleeve is somewhat collapsed to facilitate such movement; and whereby during logging traverse or movement the sleeve is caused to balloon or stretch diametrally through at least a suitable portion of its length, to move and maintain the exposed contacts against the wall of the borehole. This stretching action may be induced by suitably restricting passage of borehole fluid through the trailing end of the sleeve, as by making that end section of the sleeve of reduced diameter somewhat in the style of a sea anchor. Thus movement of the electrode contacts into engagement with the borehole wall is automatic and is incident to movement of the sleeve forwardly through an extent of fluid-filled borehole. As will become fully evident, it is immaterial what type of fluid is contained in the borehole, but as herein illustrated, the apparatus is adapted for use in boreholes filled with either conductive or non-conductive liquids such as drilling muds.

In view of the considerations hereinbefore stated and indicated, it is a principal object of the invention to provide means whereby the aforementioned borehole effects in an electrical logging system are substantially eliminated. Another object is to provide an electrode assembly which automatically brings the electrode contacts thereof into contact with a borehole wall incident to forward movement or traverse of the assembly through any desired extent of the borehole. An additional object of the invention is to provide electrode assembly apparatus for use in logging fluid-filled boreholes, which is readily and rapidly moved in one direction to desired starting position in a borehole and which automatically brings electrode means into contacting relationship with the borehole incident to movement of the apparatus in the opposite direction as a logging traverse is made.

Other objects and advantages of the invention will hereinafter become apparent from consideration of the accompanying drawings and following description of a preferred embodiment of apparatus illustrating the concept of the invention.

In the drawings:

Figure 1 is a view in longitudinal section along an extent of fluid-filled earth borehole in which apparatus according to the invention is suspended and illustrating parts disposed substantially as during lowering in the borehole;

Figure 2 is a view similar to Figure 1 but illustrating the disposition of parts of the apparatus as a logging traverse is commenced;

Figure 3 is a view similar to Figure 1 but illustrating the disposition of parts of the apparatus during upward logging traverse of the apparatus through an extent of borehole;

Figure 4 is a transverse sectional view of a fragment of a diametrally elastic sleeve shown in Figures 1–3;

Figure 5 is a longitudinal sectional view of a fragment of a diametrally elastic sleeve with a modified form of electrode contacts of a type adapted for use in boreholes containing oil-base fluids, and illustrating the electrical contact made with a borehole wall;

Figures 6 and 7 are views in elevation and partly in section of a fragment of a diametrally elastic sleeve with portions removed, illustrating electrode contact placement and interconnection in, respectively, sleeve-relaxed and sleeve-stretched, condition;

Figure 8 is a somewhat diagrammatic longitudinal sectional view along an extent of fluid-filled earth borehole, and showing the relative disposition of parts of apparatus according to the invention as the apparatus is lowered into the borehole;

Figure 9 is a view similar to Figure 8 but showing the relative disposition of parts of the apparatus as the latter is drawn upwardly or outwardly along an extent of the borehole; and Figure 10 is a transverse sectional view of an earth borehole showing apparatus depicted in Figure 9 viewed from above, and with parts disposed as the apparatus is being moved in a logging traverse.

In the drawings, 10 indicates an earth borehole, herein shown for convenience as penetrating downwardly through earth formations 12 and 14. The borehole contains a fluid, which may be drilling mud 16, and accordingly the borehole is hereinafter termed "fluid-filled," although the mud or other liquid need not extend to the outer extremity of the borehole. It is sufficient for most forms of apparatus according to the invention that liquid fill the borehole throughout the extent to be logged, and in the other forms, a gaseous fluid in the borehole will suffice.

Adapted for traverse through any desired extent of the length of the borehole in opposite idle and logging traverses or movements in a diametrally elastic sleeve indicated generally at 18 and including an upper or "leading" end section 18a, a trailing end section 18b and a middle section 18c. The sleeve may be constructed principally of rubber or other suitable elastic material. The leading end of the sleeve is adapted to be drawn forwardly (upwardly, as illustrated) by suitable means including a ring 20 (Figures 8, 9) to which an end of the sleeve is secured as by vulcanization, the ring concurrently serving to prohibit or otherwise suitably limit diametral stretching at the leading end of the sleeve. Any suitable means may be used to connect ring 20 or adjacent end of the sleeve to a cable for imparting forward (logging) movement to the sleeve; but for convenience and simplicity such means are herein shown as comprising insulated electric conductors or leads 22a, 22b, 22c, which preferably are reinforced and preferably have their lower end portions embedded in the elastic material of sleeve 18, issue from the upper end thereof, through suitable holes formed in ring 20, and extend into a suitable insulator 24 forming part of a cable head 26. Cable head 26 serves, in addition to apparatus-supporting functions hereinafter noted, as a means for electrically and mechanically connecting the conductors or leads to an electric conductor cable 28, which as known in the art, may comprise insulated electric conductors and an armoring and load-supporting sheath. Thus the sleeve is adapted to be drawn in the forward direction by cable 28, through head 26 and suitable draft harness such as straps or conductor leads 22a, b and c.

Sleeve 18 may be held against complete longitudinal collapse or involution by any suitable means, or as herein illustrated by connection to an elongate sinker or weighted means generally indicated at 30 and which extends through the interior of the sleeve. Sinker means 30 may comprise a fluid-tight chamber for housing instruments; and comprises an upper section 30a which may be secured to cable head 26 by threaded joint or in any desired suitable manner, and a lower rod-like section 30b of reduced diameter. The sinker serves as a means for moving the sleeve inwardly into a borehole by gravitational action, but it is to be understood that in certain aspects of the invention other means may be used for that purpose. The rod-like section of the sinker means serves also as a guide and retainer means for the lower end of section 18b of the sleeve.

Lower end section 18b of the sleeve is made elastic but with greater resistance to elastic deformation than is section 18c, as by being made of thicker section or of tougher and harder material, or in other suitable manner; and is provided with means or so formed as to restrict flow of fluid through the sleeve during forward movement of the sleeve while logging is proceeding. Preferably and as shown, these aims are accomplished by forming section 18b of generally more stretch-resistant material than that used in section 18c, and of generally frusto-conical outer configuration so as to provide an aperture 18e (Figure 9) somewhat larger in diameter than sinker section 30b but preferably of less diameter than the body section of sinker means 30. Sleeve section 18b is harnessed to sinker section 30b by means of a flexible substantially inelastic lower rein 32 secured at one of its ends to sleeve section 18b and at its other end to sinker section 30b. Also, section 18b may include a ring, such as indicated at 21, molded into the sleeve as shown in Figure 8. The upper end of sleeve 18 is restrained from unwanted excess of longitudinal travel along the sinker and suspension means by a flexible substantially inelastic upper rein 34 attached at respective ends to ring 20 and sinker means 30 as indicated.

The dimensions and structural arrangement of the parts thus far described is such that when the sinker means and attached sleeve are moved inwardly in a fluid-filled borehole, as by being lowered by gravity, the greater resistance to movement through the fluid offered by the sleeve and especially section 18c thereof, causes relative movement of the sinker means downward in the sleeve until lower rein 32 is drawn taut with the aperture 18e of the sleeve substantially engaged on a conical surface 30c at the juncture between the body and lower end section 30b of the sinker means. Concurrently the upper rein draws taut to hold one side of ring 20 so it leads or precedes the other side, all as indicated in Figure 8. Thus rapid idle movement of the apparatus through the fluid of the borehole is facilitated. Further, the arrangement and structures are such that as the sinker means is drawn forwardly (outwardly, as here illustrated), through an extent of borehole, the sleeve will be drawn through the fluid at its leading end by ring 20 and the conductor means 22a, b and c (or other suitable draft means), accompanied by relative movement of 18b along section 30b; whereby fluid will tend to progress through the sleeve, and, being restricted in passage through aperture 18e, will diametrally stretch the body portion 18c of the sleeve until the outer surface of the sleeve engages the borehole wall, as indicated in Figure 9. Thereafter, during continued traverse of the sleeve along the borehole at a speed above a certain minimum value, the sleeve will move with the outer surface of its body section in sliding engagement with the borehole wall, with borehole fluid exiting through aperture 18e as indicated by curved arrows in Figure 9. The minimum operating speed is dependent upon such variables as borehole fluid density, elasticity constants of the material of which the sleeve is made, borehole and sleeve dimensions, etc., and should be reduced to as low a value as is feasible by good design. Preferably the dimensions are such that in a borehole of diameter A, ring 20 of diameter B, and aperture 18e of diameter C, the following relationship will always obtain: $B^2 > A^2 - B^2$, and $B^2 > C^2$.

That is, the open area of ring 20 should exceed the annular borehole area therearound, and the area of aperture 18e should be less than the area enclosed by ring 20.

Suitable insulated electrode means, according to the invention, are disposed and arranged to be brought into sliding engagement with the borehole wall by the previously described elastic diametral stretching. Preferably, and in the interest of convenience and certainty of operation, the electrode means are comprised of suitable series of contacts each embedded in the sleeve and exposed to the outer face thereof while being insulated from fluid inside the sleeve. Each contact is electrically connected to one or more insulated electrical conductors, which conductors may conveniently be embedded or incorporated in the structure of the sleeve. A preferred mode of thus arranging the conductors, and the contacts, is hereinafter described in connection with Figures 4 through 7. It will be noted that, having their exposed bare faces outside the exterior surface of the sleeve, the contacts, during forward movement of the sleeve, will be brought forcibly into good electrical engagement with the borehole wall, whereby the electrical characteristics of the borehole fluid will be of no appreciable significance in logging operations, and "borehole effect" will be substantially eliminated.

The type, spacing, configurations and number of electrodes and of electrode contacts employed in the apparatus may be widely varied, according to the requirements of the logs to be produced. Illustrative of preferred contact types and modes of contact mounting and electrical connection, there is shown in section in Figure 4 a plurality of contacts 40 and in Figures 6 and 7 transverse rows of contacts 40a and 40b, and electrical conductor means disposed in preferred arrangement in fragmentary portions of a sleeve. As depicted, each contact, as 40, is formed with a disc-like face portion 40f integral with an anchor portion 40s here chosen to be of generally spherical form. The anchor portion and adjacent surfaces of the face portion may be embedded in the transversely (diametrally) elastic material of the sleeve, as indicated in Figure 4. An electrode comprises a series of suitably arrayed contacts; and as here illustrated as exemplary, a transverse or peripherally arranged row or series of contacts, such as 40a of Figures 6 and 7, may be comprised in a single electrode, all of the contacts of such row or series being electrically interconnected in a manner and by means presently explained.

The electrical conductors employed to interconnect contacts of an electrode, and other conductors incorporated into the sleeve structure, must be so disposed, or constructed and arranged, as to permit transverse (diametral) stretching of the sleeve; and at least some of such conductors are preferably also so disposed, or constructed and arranged, as to inhibit, limit, or prohibit, longitudinal contraction or stretching of the sleeve in all instances wherein such longitudinal change of dimension is undesirable. To these ends, conductors extending transversely in the sleeve material are convoluted or coiled, or sinuously arranged as indicated by contact-connecting conductors 42a and conductors 42b of Figures 6 and 7, whereby as the elastic sleeve stretches diametrally those conductors merely assume a more nearly straight form. As shown in Figure 7, the sleeve adjacent contact row 40b has been stretched, leaving that adjacent contact row 40a unstretched. The inter-contact conductors, such as 42a, are suitably electrically connected to appropriate contacts, as by brazing or soldering, prior to being incorporated into the elastic material of the sleeve; and the same is true of the principal leads or conductors extending longitudinally in the sleeve and employed to connect respective electrodes with other electrodes and/or apparatus in sinker means 30 and/or the conductors of cable 28.

To inhibit longitudinal changes in dimension of the sleeve, when that is desired, longitudinally extending conductors, such as those comprised in 22a, 22b and 22c, may be embedded in straight condition in the sleeve, and supplemented if necessary or desirable by suitable flexible stiffeners and/or stretch-limiting flexible cords or conductors. Such elements, in the form of conductors 44a and 44b, are illustrated in Figure 6. Certain of the longitudinally extending conductors, especially smaller conductors not adapted to bear mechanical loading, may be embedded in the sleeve in sinuous form, as indicated by conductors 46a and 46b in Figures 6 and 7.

Under certain circumstances, as, for example, when the borehole fluid is an oil-base mud or when there is a mud-cake of undesirable characteristics on the borehole wall, it may be advantageous to employ in the electrode means brush-like contacts which scratch through the mud-cake or coating on the borehole wall and effect good electrical connection with the formation rock. Contacts of such characteristics are illustrated in Figure 5, wherein a portion of elastic sleeve 18′ is depicted in section with electrode contacts 50 supported in scratching engagement with a borehole wall 10′. Each of this type of contacts comprises an anchor portion 50a embedded in the sleeve material and supporting a plurality of stiff spring-like wire bristles 50b of suitable material such as Phosphor bronze or steel. It is evident that as the brush-like contacts are moved outwardly by diametral enlargement of the sleeve incident to forward traverse in an extent of borehole, the bristles will be brought into engagement with the borehole wall by a combined radial thrust and longitudinal travel, whereby wall coatings or cakes are penetrated and/or removed and the bristles effect good electrical connection with the formation encircling the borehole. The bristles may electrically connect with inter-contact conductors or leads in any suitable way, as for example, by being mounted in a cast anchor block such as 50a of electrically conductive material, to which is in turn brazed or soldered an end or portion of a conductor, as indicated at the lower end of conductor 60 in Figure 5.

While an illustrative form of apparatus conforming to the concept of the invention has been illustrated and described, it is evident that many details may be changed in form and structural arrangement; and this applies especially to the matter of size, shape and spacing of the contacts of any given electrode, and the inter-electrode spacing. It being thus noted that modifications within the concept and scope of the invention are suggested or will occur to those skilled in the art, it is not desired to be restricted to specific details of the preferred exemplary embodiment of apparatus depicted and described, but what is claimed is:

1. A well logging electrode assembly including, in combination: an elongated central body member; an elongated sleeve member having a leading end and a trailing end and normally spaced from and approximately concentrically surrounding said body member, said sleeve member terminating at its leading end in a rigid annular opening member and at its trailing end in an opening of a diameter substantially less than that of said annular opening member, and having an intermediate, diametrally elastic body portion of a predetermined diameter greater than said opening in its trailing end; flexible connector means interconnecting said annular opening member and said body member operable to suspend said annular opening member and said sleeve member approximately concentric with said body member as aforesaid; and valve means carried by said body member and operable by longitudinal movement of said body member relative to said sleeve member in one direction for opening and in the opposite direction for closing said opening in the trailing end of said sleeve member; and electrode means carried by and exposed only on the outer side of said sleeve member.

2. An electrode assembly as defined in claim 1 in which the sleeve member comprises a substantially imperforate insulating body.

3. A well logging electrode assembly including, in combination: an elongated sleeve member having an open leading end opening; an intermediate, diametrally elastic body section of predetermined diameter when relaxed, and a trailing end opening of a diameter substantially less than the said predetermined diameter; electrode means carried by and exposed only on the outer side of said body section; and valve means for closing said trailing end opening when said assembly is moved trailing end first, and for opening said trailing end opening when said assembly is moved leading end first through a fluid-filled borehole; and means to suspend and move said assembly in a fluid-filled borehole.

4. An electrode assembly as defined in claim 3 in which the wall of the sleeve member comprises substantially imperforate insulating material.

5. A well logging electrode assembly for use in a fluid-filled earth borehole, comprising, in combination: a sleeve member having a body section diametrally elastic and having an open leading end provided with a first aperture of predetermined area and a trailing end provided with a second aperture of smaller area than said first aperture so as to restrict flow of fluid through said sleeve member from leading to trailing end; electrode means including contacts exposed at locations outside said sleeve and arranged for longitudinal traverse through a borehole with said sleeve; and means for traversing said assembly leading end first through a fluid-filled earth borehole whereby to cause said sleeve member to diametrally stretch and force said contacts into substantial contact with the wall of such borehole.

6. An electrode assembly for use in electric logging of oil well and like earth boreholes, comprising, in combination: an elastic sleeve having a leading end and a trailing end and an intermediate body section of predetermined diameter when in relaxed condition; means forming a leading end aperture and a trailing end aperture smaller than the leading end aperture; electrode means supported on said body section and exposed at only the exterior surface of the sleeve; means to limit longitudinal change of dimension of said sleeve while permitting diametral expansion thereof; and means including means for traversing said sleeve through a fluid-filled borehole leading end first, to cause diametral expansion of said body portion incident to ballooning of the sleeve induced by traverse through said fluid, whereby said electrodes are brought and maintained in close proximity to the borehole wall during such traverse.

7. A well logging electrode assembly including in combination: a diametrally elastic sleeve having an open leading end section; a body section of substantially predetermined diameter in the relaxed state, and an open trailing end of a diameter less than said predetermined diameter; electrode means comprising a plurality of series of contacts, each series of contacts comprising individual contacts peripherally arranged around said sleeve, the series being longitudinally spaced along the body section of said sleeve and exposed at the outside thereof; and means to traverse said sleeve, leading end-section forward, through a fluid-filled borehole of normal diameter in excess of said predetermined diameter of said body section in the relaxed state to cause said sleeve to stretch diametrally to cause said electrode means to be moved along and substantially in contact with the wall of such borehole.

8. An electrode assembly as defined in claim 7, the contacts comprising brush-like electrically conductive devices for brushing engagement with the borehole wall.

9. A well logging electrode assembly for use in a borehole having a diameter A, said assembly including in combination: an elongated sleeve member having an open leading end opening of diameter B; an intermediate, diametrally elastic body section, and a trailing end opening of diameter C, with $B^2 > A^2 - B^2 > C^2$; electrode means carried by and exposed only on the outer side of said body section; valve means for closing said trailing end opening when said assembly is moved trailing end first and for opening said trailing end opening when said assembly is moved, leading end first, through a fluid-filled borehole; and means to suspend and move said assembly in a fluid-filled borehole.

References Cited in the file of this patent

UNITED STATES PATENTS

| | | |
|---|---|---|
| 2,476,137 | Doll | July 12, 1949 |
| 2,552,428 | Hildebrandt | May 8, 1951 |
| 2,688,115 | Hildebrandt | Aug. 31, 1954 |
| 2,732,525 | Blanchard | Jan. 24, 1956 |